United States Patent

[11] 3,615,678

| [72] | Inventors | Frank P. Tangel<br>Oakland;<br>Argillo Musetti, Fairlawn, both of N.J. |
|---|---|---|
| [21] | Appl. No. | 772,078 |
| [22] | Filed | Oct. 31, 1968 |
| [45] | Patented | Oct. 26, 1971 |
| [73] | Assignee | Buitoni Foods Corporation |

[54] PROCESS FOR MAKING COVERED PIZZA
7 Claims, 3 Drawing Figs.

[52] U.S. Cl. .................................................. 99/86,
99/92, 99/192 BB
[51] Int. Cl. ........................................................ A21d 8/06
[50] Field of Search ........................................... 99/86, 92,
87, 192 BB; 107/1, 1.1, 1.6, 1.65, 7, 54, 54.2

[56] References Cited
UNITED STATES PATENTS

| 1,591,945 | 7/1926 | Sawkins ........................ | 99/87 UX |
| 1,596,652 | 8/1926 | Giovannetti .................. | 99/86 UX |
| 2,668,117 | 2/1954 | Bucci ........................... | 99/92 X |
| 2,714,861 | 8/1955 | Castronuovo ................ | 99/86 UX |
| 2,774,316 | 12/1956 | Daino ........................... | 99/86 UX |

*Primary Examiner*—Raymond N. Jones
*Assistant Examiner*—James R. Hoffman
*Attorney*—Irvin A. Lavine ABSTRACT: A process for producing pizza having two dough layers with a tomato base sauce in a pocket between them; the dough is made of durum flour and leavening, is formed into sheets, a quantity of sauce is placed between the sheets, the raw pizza being then proofed, and cooked between plates having a predetermined spacing.

PATENTED OCT 26 1971 3,615,678
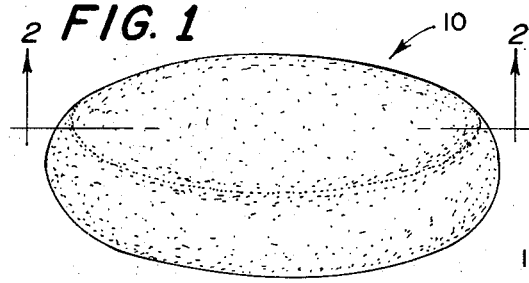
FIG. 1
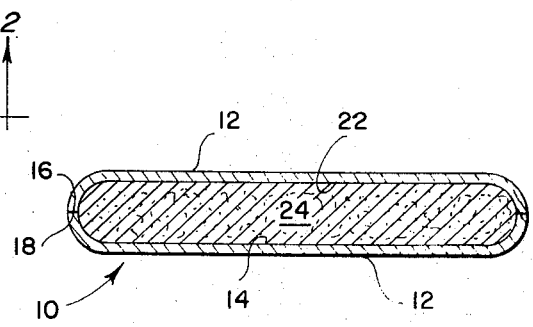
FIG. 2
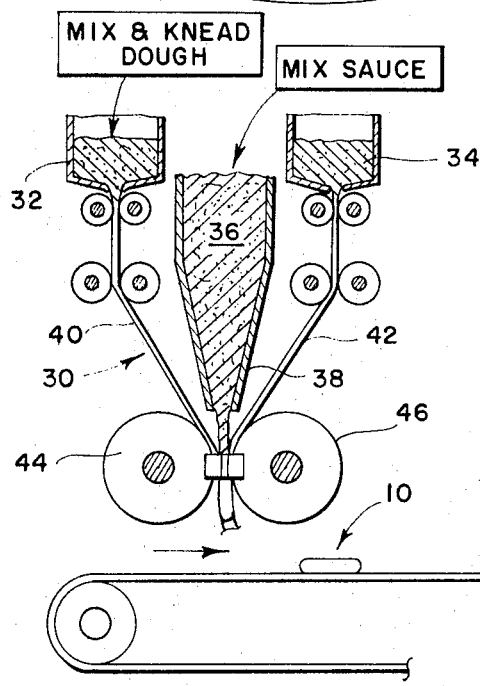
FIG. 3
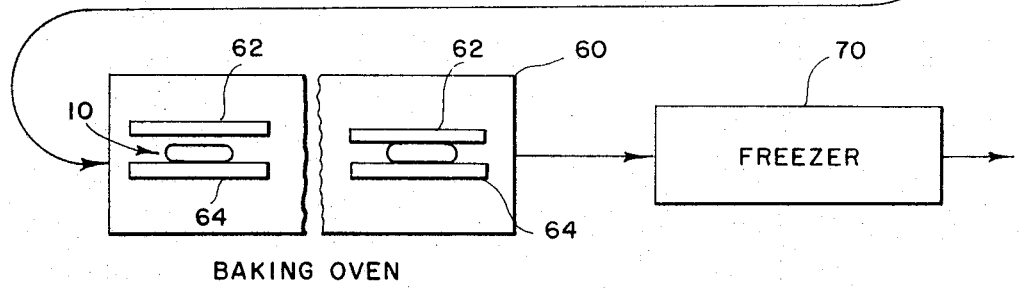
BAKING OVEN
INVENTORS
FRANK P. TANGEL
ARGILLO MUSETTI
BY *Irvin A. Lavine*
ATTORNEY

PROCESS FOR MAKING COVERED PIZZA

BACKGROUND OF THE INVENTION

The present invention pertains to a process for making, in a continuous manner, a pizza comprising two layers of dough and a tomato base sauce between the dough layers.

Pizzas are conventionally made by making dough, and a tomato base sauce, combining them, and thereafter cooking or baking the thus prepared raw pizza. In making the dough, relatively standard ingredients comprising ordinary wheat flour are used, together with a leavening agent which is typically yeast. The dough is mixed, kneaded, and cut into lumps, which are then placed on trays and proofed for one to two hours. After proofing, the dough lump is manually placed onto a platen which is then manually placed into a hydraulic forming machine which presses the dough lump into a sheet. This sheet is generally circular in configuration, and is adjusted by hand to the size and shape of the platen on which it is placed. It is not unusual for the dough to adhere to the platen of the forming machine, so that manual removal is often required. After the dough has been adjusted to the platen on which it is positioned, the platens of the pressed dough are manually placed on top of each other, and then put into a continuous-baking oven; in proceeding through the oven, two pizza dough discs are stacked one on top of the other, and after baking, the discs are separated and the two baked shells or discs are removed by hand. After baking, the shells are each provided with suitable sauces made from a tomato base, a cheese is placed on the sauce, and then the pizza at this stage is either baked in an oven for immediate consumption, or may be frozen and packaged, to be sold as a frozen pizza. In addition, the shells of dough may be left uncoated, and sold to a pizza parlor, where the tomato sauce and cheese are added, for baking to order.

As may be seen from the above, the known process for making pizzas presents a number of obstacles to the manufacturer of pizza in a continuous manner. The pizza doughs previously used have often stuck to the equipment, requiring manual removal. An extensive amount of manual manipulation of the pizza dough has been required. In addition, it has been found that when the dough is formed or compressed into a sheet, it does not obtain a uniform thickness: after the pressing or forming force is relieved, the dough, having some resiliency, springs back or becomes larger than its minimum thickness, and after springing back the dough layer is not of uniform thickness. When the shell is baked, it does not rise uniformly. These anomalies are somewhat cumulative, thereby resulting in a baked shell of such uneven thickness that it would not be suitable for the manufacture of a covered pizza which is to have a maximum predetermined thickness, while providing for a desired sauce content in the pocket thereof, relative to the total quantity of dough. Further, dough proofing has required such a long period of time that a proofing chamber for continuous production would be unduly expensive in plant space, in cost, and in energy requirements.

In addition to the above described known and widely used process for manufacturing pizzas having only a single dough layer and herein designated opened-faced pizzas, it also has been disclosed that a pizza may be made by first baking bread, and then slicing it, and then applying a pizza filling or sauce onto one of the bread slices; thereafter a second bread slice placed over the filling, and the edges of the two bread slices are pressed together to provide an edge seal; then the assembled pizza comprising two baked bread slices with a pizza filling between them is frozen. Such a process does not lend itself to the production of a palatable pizza, since bread does not have the taste of and flavor of a genuine pizza dough, since it is most likely that the pizza filling will seep through the porous bread slices, and since it is doubtful that an appropriate seal can be established on a production basis on each of the pizzas thus made.

SUMMARY OF THE INVENTION

The present invention provides a process for making a covered pizza, that is, a pizza having two dough layers sealed together about their peripheries and providing a pocket between them in which pocket is a sauce. The process comprises the steps of making a sauce comprised primarily of tomatoes, tomato paste, and mozzarella cheese: the sauce is made from peeled tomatoes, tomato paste, water, vegetable oil, corn starch and minor amounts of salt, sugar, spices and garlic, and to a tomato sauce conventionally made from these constituents, mozzarella cheese is added. The sauce when completed comprises about 72 percent liquids and 28 percent solids. The dough is made by mixing durum wheat flour with leavening, such as compressed yeast, together with water, corn oil, malt and minor amounts of salt, sugar, spices, and garlic. This dough does not stick to any surfaces of the equipment utilized in the process, and compresses and springs back uniformly. The dough is formed into two sheets, and a quantity of the sauce is placed between the dough sheets or layers and the dough of one layer is sealed to the dough of the other layer around this sauce, so that the sauce is then in a pocket between two dough layers. This provides a covered pizza, which is then proofed at 95°–98° F. for a period of about 10 to 20 minutes, and at a relative humidity of about 80 percent to 85 percent. Thereafter, the pizza is placed between two metal plates which are spaced apart approximately eleven-sixteenths of an inch, which is a thickness greater than the covered pizza after proofing, and is then cooked in an oven at a temperature of approximately 300°. The cooking takes place for approximately 2 minutes, and the plates impart heat by contact into the upper and lower surfaces of the pizza, after the dough sheets or layers of the covered pizza have risen, further, in the over and after the proofing The covered pizza, partially cooked, is then cooled, frozen, and packaged.

Among the objects of the present invention are the provision of a process for making a covered pizza on a continuous basis, to provide a process which will yield a covered pizza of a predetermined maximum thickness, to provide a process which will provide a covered pizza having a suitable ratio of dough to sauce, to provide a process which does not require equipment beyond the capabilities of the present state of the art to provide a process which does not require an undue amount of plant space or energy, to the end that covered frozen pizzas may be manufactured economically, and to provide a process which permits the manufacture of palatable, normal-tasting pizzas which may be frozen and then finish baked in an ordinary toaster.

BRIEF DESCRIPTION OF THE DRAWING

FIG. 1 is a perspective view of a covered pizza made in accordance with the process of the present invention.

FIG. 2 is a cross-sectional view taken on the line 2—2 of FIG. 1.

FIG. 3 is a diagrammatic sketch showing the method steps for producing the covered pizza shown in FIGS. 1 and 2.

DESCRIPTION OF THE PREFERRED EMBODIMENT

The covered pizza which is the product of the present invention process is shown in perspective view in FIG. 1, the pizza being designated 10 and comprising a generally disclike product. Referring to FIG. 2, it may be seen that the pizza 10 comprises an upper dough layer 12 and a lower dough layer 14, the dough layers 12 and 14 meeting and being sealed together at their edges 16 and 18, which extend peripherally around an internal pocket 22 formed by the dough layers 12 and 14. Within the pocket 22 is a tomato base source, 24 which comprises primarily tomatoes, tomato sauce, and cheese, although other ingredients are preferably provided as will be set forth hereinbelow. The pizza 10 has the top and bottom thereof substantially parallel, and spaced apart so that the pizza has a thickness of approximately eleven-sixteenths of an inch, and preferably not exceeding that thickness, in order that it may be easily placed into and removed from the opening of a conventional toaster.

In order to overcome the above-noted deficiencies of conventional pizza, to provide a dough which is entirely compatible with the goals of the present invention process, and to make a palatable covered pizza, a unique dough is made. This dough is made essentially from 300 pounds of durum wheat flour, and with about 105 pounds to about 125 pounds of water, from about 3 pounds to about 9 pounds corn oil, and about 7 pounds to about 11 pounds of compressed yeast, and about 7 pounds to about 10 pounds malt. To these ingredients there are added minor amounts of slat, sugar, spice, and garlic. It will be understood that these last enumerated ingredients have little or no effect upon the handling and baking qualities of the pizza dough, but are put in for flavoring. Specifically, dough of the present invention contains to each 300 pounds of drum wheat flour, about 117 pounds of water, about 5.3 pounds of corn oil, about 9 pounds of compressed yeast and about 8.4 pounds of malt. These ingredients are mixed and kneaded, and the dough is then placed adjacent a machine designated as a combining machine. In this machine, as will be set forth hereinbelow, the dough is sheeted into layers.

The sauce is a tomato base sauce and comprises, by weight, from about 20 percent to 50 percent peeled tomatoes, from about 35 percent to about 45 percent tomato paste, from about 5 percent to about 20 percent water, from about 5 percent to about 8 percent vegetable oil, from about 2 percent to about 4 percent corn starch, and minor amounts of slat, sugar, spices, and garlic. Preferably, the peeled tomatoes comprise about 29 percent, the tomato paste about 41 percent, the water about 16 percent, the vegetable oil about 6.5 percent and the corn starch about 3.2 percent. These percentages are of the total weight of the sauce, without cheese. To approximately 100 pounds of sauce, approximately 60 pounds of mozzarella cheese are added. The sauce comprises about 72 percent liquids, and 28 percent solids, as determined by dehydration and weighing tests normal in the art; it is semiliquid and flowable at both room temperature and at the elevated temperatures achieved in an oven, and in a toaster. The consistency or thickness of the sauce is similar to that of tomato paste. The sauce may be mixed, the cheese added, and the sauce and cheese then pumped to a suitable combining machine.

Referring to FIG. 3, the previously described steps of mixing and kneading the dough and mixing the sauce are diagrammatically illustrated. The dough and sauce are then delivered to a combining machine generally designated 30, of a kind known in the art. The combining machine has two dough hoppers 32 and 34, and a sauce hopper 36. Each of the dough hoppers 32 and 34 has a pair of rollers in the bottom thereof defining an outlet from the hopper and it is between these rollers that the dough leaves the hopper, being sheeted by the rollers in known fashion. The dough sheets 40 and 42 are fed between two forming rollers 44 and 46, and the sauce, which has been delivered to the sauce hopper 36, exits therefrom through a nozzle or conduit 38 and into the juncture formed by the dough sheets 40 and 42 supported by the forming rollers 44 and 46. The forming rollers 44 and 46 cause the dough sheets to be adhered and sealed to each other, with a quantity of the sauce in a pocket between them, to thereby provide the covered pizza 10. Pizza 10 is delivered by a conveyor or the like into a proofing chamber 50.

It will be understood that the size and configuration of the forming rollers 44 and 46 determines the total thickness of the pizza as delivered from the combining machine 30, and that at the time the pizza 10 is delivered from the forming machine 30, the dough has not yet become leavened.

In the art of leavening dough preparation, the step of proofing is provided in order to give the yeast or other leavening agent time to grow, and in this growing process a gas, carbon dioxide in the case of yeast, is evolved; it is this evolved gas which creates the familiar cellular structure of leavened dough products, and which causes the entire dough body to rise or leaven. Traditionally, the proofing step requires 1 to 2 hours, and in the manufacture of a product in a continuous manner, either an extremely large proofing chamber would be required in order to provide a continuous process, or alternatively a noncontinuous process would have to be relied upon, in which the dough product is placed into a proofing chamber, as on a cart, and left there for a necessary period of time to permit the leavening.

Due to the use of a dough made with durum flour, the proofing time is sufficiently short to enable the proofing chamber to be of a satisfactorily economical size. In particular, proofing requires only approximately 15 minutes, when the proofing chamber is maintained at a temperature from approximately 95° F. to approximately 98° F. at 80–85 percent relative humidity. The proofing time may vary 5 minutes either more or less, although the noted 15 minute proofing time has been found to be optimum.

After proofing, the covered pizza is cooked in a continuous oven between upper and lower open-sided plates, the oven being maintained at a temperature of from approximately 290° F. to approximately 310° F. As shown in FIG. 3, the baking oven 60 comprises a series of upper plates 62 and lower plates 64, these plates being of heat-conducting material, such as iron or steel, and being spaced apart a predetermined distance, approximately eleven-sixteenths of an inch. The space between the plates 62 and 64 is open so that hot air is able to contact the sides of the pizza 10. The pizza remains in the oven for approximately 2 minutes, within a time variation of approximately 10 seconds more or less. During this time, the pizza 10, which is initially placed upon a lower plate 64, increases in thickness, due to further leavening of the dough comprising the dough layers, until the upper surface of the upper dough layer engages the bottom surface of an upper plate 62, and thereafter the continued heat input into the pizza within the baking over 60 causes the dough to have a browned crust appearance, although it is to be understood that the pizza when it is delivered from the baking oven 60 is not completely cooked. In particular, the dough layers are not entirely cooked (baked or fried) but are only partially cooked. After removal from the baking oven 60 and cooling in air, the pizzas are passed to a freezer 70 which reduces their temperature to −40° F. Thereafter, the pizzas are packaged and stored for delivery to grocery stores and the like.

Pizzas in accordance with the present invention are particularly suitable for finish cooking in a toaster, which finish cooking completes the cooking of the dough layers, completing the browning of the dough layers and giving then a pleasing appearance and a fully cooked taste. This finish cooking of the pizza dough also completes the attainment of the necessary flavor, temperature, texture, and other palatability factors. Also, the finish cooking in the toaster serves to heat the sauce to a satisfactory eating temperature.

It will be understood that the pizzas while traveling through the oven are not heated to the point where they explode, thereby soiling the equipment and resulting in downtime, while at the same time, they achieve a suitable thickness for later insertion into a toaster. This uniformity of thickness is achieved because the dough utilized stretches substantially uniformly when compressed, and springs back uniformly; further the baking of the dough does not result in significant variation of dough thickness.

The method herein disclosed for making the sauce contributes significantly to the continuous process of the invention, in that it enables the continuous production of a covered pizza with a tomato base sauce including cheese.

It will be obvious to those skilled in the art that various changes may be made without departing from the spirit of the invention and therefore the invention is not limited to what is described in the specification but only as indicated in the appended claims.

We claim:

1. A process for making a covered pizza having two dough layers and a sauce between them for finish cooking in a toaster comprising:

a. making a sauce from ingredients comprising tomatoes and cheese,
b. making a dough from ingredients consisting essentially of durum wheat flour and leavening, said leavening being in an amount such that it has a leavening effect equivalent to about 7–11 pounds of compressed yeast to about 300 pounds of said durum wheat flour,
c. sheeting the dough,
d. forming a raw covered pizza with a quantity of said sauce between two layers of said dough, said dough layers being sealed to each other and providing a pocket containing said sauce,
e. proofing said raw covered pizza,
f. partially cooking said covered pizza in an oven between parallel heat conducting plates spaced sufficiently close so that said pizza rises and contacts both said plates in said oven, and
g. freezing said partially cooked pizza.

2. The process of claim 1, wherein said sauce is made from tomatoes, tomato paste and cheese.

3. The process of claim 1, wherein said dough is formed into two sheets, a quantity of sauce is placed between dough layers provided by said two sheets, and said layers are sealed to each other peripherally about said sauce.

4. The process of claim 1, wherein said raw covered pizza is proofed for about 10 to about 20 minutes at a temperature of about 95° F. to about 98° F. and at a relative humidity of from approximately 80 percent to approximately 85 percent.

5. The process of claim 1, said plates being spaced approximately eleven-sixteenths of an inch and said oven having a temperature of from approximately 290° F. to approximately 310° F.

6. A process for making pizza having two dough layers and a sauce between them for finish cooking in a toaster comprising:
a. making a sauce of tomatoes, tomato paste and cheese,
b. making a dough from ingredients consisting essentially of durum wheat flour and leavening, said leavening being in an amount such that is has a leavening effect equivalent to about 7–11 pounds of compressed yeast to about 300 pounds of said durum wheat flour,
c. forming the dough into two sheets,
d. placing a quantity of sauce between said dough sheets and sealing said dough sheets to each other with said sauce in a pocket formed by said dough sheets to thereby provide a covered pizza,
e. proofing said covered pizza at a temperature of about 95° F. to about 98° F. for about 10 minutes to about 20 minutes, and at a relative humidity of from approximately 80 percent to approximately 85 percent,
f. cooking said covered pizza between heat conducting plates spaced apart approximately eleven-sixteenths of an inch in an oven at a temperature of from approximately 290° F. to approximately 310° F.

7. A process for the making of a product having two dough layers and a sauce between them for finish cooking in a toaster comprising:
a. making a semiliquid sauce flowable at room temperature and at temperatures achieved in an oven and in a toaster,
b. making a dough from ingredients consisting essentially of durum wheat flour and leavening, said leavening being in an amount such that it has a leavening effect equivalent to about 7–11 pounds of compressed yeast to about 300 pounds of said durum wheat flour;
c. sheeting the dough;
d. forming a raw product with a quantity of said sauce between two layers of said dough, said dough layers being sealed to each other and providing a pocket containing said sauce;
e. proofing said raw product;
f. partially cooking said product in an oven between parallel spaced heat-conducting plates spaced sufficiently close so that said product rises and contacts both said plates in said oven, and
g. freezing said partially cooked product.